(12) United States Patent
Chen

(10) Patent No.: US 10,739,570 B2
(45) Date of Patent: Aug. 11, 2020

(54) TELEPHOTO LENS ASSEMBLY

(71) Applicants:Sintai Optical (Shenzhen) Co., Ltd., ShenZhen, Guandong Province (CN); Asia Optical Co., Inc., Taichung (TW)

(72) Inventor: Po-Yu Chen, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 280 days.

(21) Appl. No.: 15/854,941

(22) Filed: Dec. 27, 2017

(65) Prior Publication Data

US 2018/0335612 A1  Nov. 22, 2018

(30) Foreign Application Priority Data

May 19, 2017 (CN) .......................... 2017 1 0355043

(51) Int. Cl.
 *G02B 3/02* (2006.01)
 *G02B 13/02* (2006.01)
 *G02B 13/00* (2006.01)
 *G02B 1/04* (2006.01)
 *G02B 9/60* (2006.01)

(52) U.S. Cl.
 CPC ............. *G02B 13/02* (2013.01); *G02B 1/041* (2013.01); *G02B 9/60* (2013.01); *G02B 13/0045* (2013.01)

(58) Field of Classification Search
 CPC ...................................................... G02B 13/02
 USPC ........................................................ 359/714
 See application file for complete search history.

(56) References Cited

U.S. PATENT DOCUMENTS 9,411,133 B1   8/2016  Hsieh et al.
2018/0188501 A1*  7/2018  Lee .................... G02B 13/0065

FOREIGN PATENT DOCUMENTS

TW           201629572 A     8/2016

* cited by examiner

*Primary Examiner* — James C. Jones
(74) *Attorney, Agent, or Firm* — McClure, Qualey & Rodack, LLP

(57) ABSTRACT

A telephoto lens assembly comprises sequentially from an object side to an image side along an optical axis a first lens, a second lens, a third lens, a fourth lens and a fifth lens, all of which are arranged in order from an object side to an image side along an optical axis. The first lens is with positive refractive power, which includes a convex surface facing the object side. The second lens is with negative refractive power. The third lens is with positive refractive power. The fourth lens is with positive refractive power. The fifth lens is with negative refractive power. The telephoto lens assembly satisfies the following condition: DFOV≤40 Degrees; wherein DFOV is a diagonal field of view.

16 Claims, 15 Drawing Sheets

TELEPHOTO LENS ASSEMBLY

BACKGROUND OF THE INVENTION

Field of the Invention

The invention relates to a telephoto lens assembly, and in particular, to telephoto lens assembly applied to mobile phone, game machine, camera, projector wearable devices or other lens assembly.

Description of the Related Art

The well-known telephoto lens assembly with five lenses usually has long overall length. Because of this reason, the telephoto lens assembly is difficult to meet the requirement of miniaturization. Furthermore, the back foal length of the lens system is rather short. The difficulty for installing the lens assembly is relatively increased. Therefore, a telephoto lens assembly needs a new structure in order to enhance the characteristics described above and meet the requirement of the present.

BRIEF SUMMARY OF THE INVENTION

The invention provides a telephoto lens assembly to solve the above problems. The telephoto lens assembly is provided with characteristics of miniaturization, long back foal length and high resolution, and still has good optical performance.

The telephoto lens assembly in accordance with the invention in sequence from an object side to an image side along an optical axis, comprises a first lens with positive refractive power, which includes a convex surface facing the object side; a second lens with negative refractive power; a third lens with positive refractive power; a fourth lens with positive refractive power; a fifth lens with negative refractive power; the telephoto lens assembly satisfies the following condition: DFOV≤40 Degrees, wherein DFOV is a diagonal field of view of the telephoto lens assembly.

The telephoto lens assembly in accordance with the invention in sequence from an object side to an image side along an optical axis, comprises a first lens with positive refractive power, which includes a convex surface facing the object side; a second lens with negative refractive power; a third lens with positive refractive power; a fourth lens with positive refractive power; a fifth lens with negative refractive power; the telephoto lens assembly satisfies the following condition: $0.9<|f/TTL|$, wherein f is an effective focal length of the telephoto lens assembly and TTL is total track length which is from the object side surface of the first lens to the image side along the optical axis.

In accordance with the invention, the second lens includes a convex surface facing the object side and a concave surface facing the image side, the telephoto lens assembly satisfies the following condition: $0.21<|f_2/f|<1.53$, wherein $f_2$ is an effective focal length of the second lens and f is an effective focal length of the telephoto lens assembly.

In accordance with the invention, the third lens includes a convex surface facing the object side and a concave surface facing the image side, the telephoto lens assembly satisfies the following condition: $0.65<|f_3/f|<2.01$, wherein $f_3$ is an effective focal length of the third lens and f is an effective focal length of the telephoto lens assembly.

In accordance with the invention, the telephoto lens assembly satisfies the following condition: $0.10<|f_5/f|<1.25$, wherein $f_5$ is an effective focal length of the fifth lens and f is an effective focal length of the telephoto lens assembly.

In accordance with the invention, the telephoto lens assembly satisfies the following condition: $0.32<|BFL/TTL|<1$, wherein BFL is back focal length which is from the image side of the fifth lens to the image side along the optical axis and TTL is total track length which is from the object side surface of the first lens to the image side along the optical axis.

In accordance with the invention, the telephoto lens assembly satisfies the following condition: $0.4<|BFL/TTL|<1$, wherein BFL is back focal length which is from the image side of the fifth lens to the image side along the optical axis and TTL is total track length which is from the object side surface of the first lens to the image side along the optical axis.

In accordance with the invention, the telephoto lens assembly further comprises a stop disposed between the first lens and the second lens.

In accordance with the invention, the first lens is made of plastic material, the second lens is made of plastic material, the third lens is made of plastic material, the fourth lens is made of plastic material, the fifth lens is made of plastic material, at least one of the surfaces of the first lens is aspherical, at least one of the surfaces of the second lens is aspherical, at least one of the surfaces of the third lens is aspherical, at least one of the surfaces of the fourth lens is aspherical, at least one of the surfaces of the fifth lens is aspherical, the fourth lens includes a concave surface facing the object side and a convex surface facing the image side, the fifth lens includes a concave surface facing the image side.

In accordance with the invention, the telephoto lens assembly satisfies the following condition: 15 Degrees≤DFOV≤40 Degrees, $0.9<|f/TTL|<1.3$, wherein DFOV is a diagonal field of view of the telephoto lens assembly, f is an effective focal length of the telephoto lens assembly and TTL is total track length which is from the object side surface of the first lens to the image side along the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
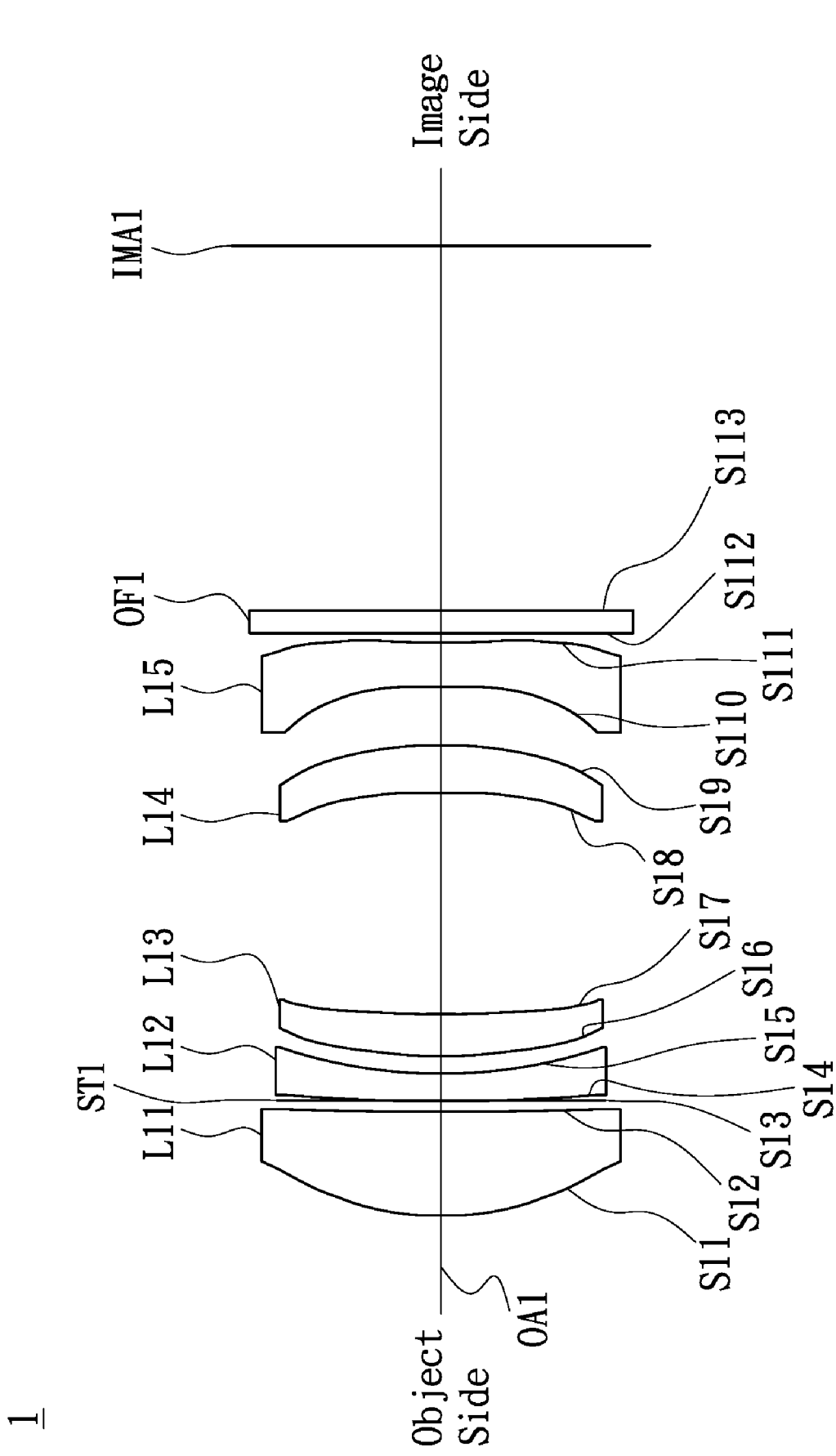
FIG. 1 is a lens layout and optical path diagram of a telephoto lens assembly in accordance with a first embodiment of the invention.

Referring to FIG. 1, FIG. 1 is a lens layout and optical path diagram of a telephoto lens assembly in accordance with a first embodiment of the invention. The telephoto lens assembly 1 includes a first lens L11, a stop ST1, a second lens L12, a third lens L13, a fourth lens L14, a fifth lens L15 and an optical filter OF1, all of which are arranged in sequence from an object side to an image side along an optical axis OA1. In operation, an image of light rays from the object side is formed on an image plane IMA1.

The first lens L11 is a meniscus lens with positive refractive power. The first lens L11 is made of plastic material, wherein the object side surface S11 is a convex surface, the image side surface S12 is a concave surface and both of the object side surface S11 and image side surface S12 are aspheric surfaces.

The second lens L12 is a meniscus lens with negative refractive power. The second lens L12 is made of plastic material, wherein the object side surface S14 is a convex surface, the image side surface S15 is a concave surface and both of the object side surface S14 and image side surface S15 are aspheric surfaces.

The third lens L13 is a meniscus lens with positive refractive power. The third lens L13 is made of plastic material, wherein the object side surface S16 is a convex surface, the image side surface S17 is a concave surface and both of the object side surface S16 and image side surface S17 are aspheric surfaces.

The fourth lens L14 is a meniscus lens with positive refractive power. The fourth lens L14 is made of plastic material, wherein the object side surface S18 is a concave surface, the image side surface S19 is a convex surface and both of the object side surface S18 and image side surface S19 are aspheric surfaces.

The fifth lens L15 is a biconcave lens with negative refractive power. The fifth lens L15 is made of plastic material, wherein the object side surface S110 is a concave surface, the image side surface S111 is a concave surface and both of the object side surface S110 and image side surface S111 are aspheric surfaces.

Both of the object side surface S112 and image side surface S113 of the optical filter OF1 are plane surfaces.

In addition, the telephoto lens assembly 1 of the first embodiment at least satisfies one of the following conditions:

$$0.9 < |f1/TTL1| < 1.3 \tag{1}$$

$$0.21 < |f1_2/f1| < 1.53 \tag{2}$$

$$0.65 < |f1_3/f1| < 2.01 \tag{3}$$

$$0.10 < |f1_5/f1| < 1.25 \tag{4}$$

$$0.4 < |BFL1/TTL1| < 1 \tag{5}$$

$$15 \text{ Degrees} \leq DFOV1 \leq 40 \text{ Degrees} \tag{6}$$

$$0.32 < |BFL1/TTL1| < 1 \tag{7}$$

wherein f1 is an effective focal length of the telephoto lens assembly 1, TTL1 is total track length which is from the object side surface S11 of the first lens L11 to the image side IMA1 along the optical axis OA1, $f1_2$ is an effective focal length of the second lens L12, $f1_3$ is an effective focal length of the third lens L13, $f1_5$ is an effective focal length of the fifth lens L15, BFL1 is back focal length which is from the image side surface S111 of the fifth lens L15 to the image side IMA1 along the optical axis OA1, DFOV1 is a diagonal field of view of the telephoto lens assembly 1.

By the above design of the lenses and stop ST1, the telephoto lens assembly 1 is provided with characteristics of a short total track length, a long back foal length, a high resolution and an aberration that can be corrected effectively.

The telephoto lens assembly 1 in accordance with the FIG. 1 is provided with the optical specifications shown in Table 1. Table 1 shows that the effective focal length is equal to 9.989 mm, F-number is equal to 2.8 and total lens length is equal to 9.000 mm and diagonal field of view is equal to 28.85 degrees for the telephoto lens assembly 1 of the first embodiment of the invention.

TABLE 1

Effective Focal Length = 9.989 mm
F-number = 2.8
Total Lens Length = 9.000 mm
Diagonal Field of View = 28.85 degrees

| Surface Number | Radius of Curvature (mm) | Thickness (mm) | Nd | Vd | Remark |
|---|---|---|---|---|---|
| S11 | 2.622688 | 0.9519626 | 1.535 | 55.71 | The First Lens L11 |
| S12 | 10.79441 | 0.1273464 | | | |
| S13 | ∞ | −0.02 | | | Stop ST1 |
| S14 | 10.58199 | 0.2497405 | 1.651 | 21.52 | The Second Lens L12 |
| S15 | 3.754954 | 0.1767509 | | | |
| S16 | 5.378957 | 0.3923755 | 1.515 | 56.62 | The Third Lens L13 |
| S17 | 25.53002 | 2.053861 | | | |
| S18 | −5.36015 | 0.4393749 | 1.651 | 21.52 | The fourth L14 |
| S19 | −3.472275 | 0.5477041 | | | |
| S110 | −5.039201 | 0.399846 | 1.535 | 55.71 | The fifth lens L15 |
| S111 | 9.382637 | 0.08236867 | | | |
| S112 | ∞ | 0.21 | 1.517 | 64.17 | Optical Filter OF1 |
| S113 | ∞ | 3.389111 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C | D |
|---|---|---|---|---|---|
| S11 | −1.045082 | 0.217 | 0.000739 | −0.00046 | −3.49E−05 |
| S12 | −59.18412 | −0.01109 | 0.004504 | −0.00161 | 107 |
| S14 | −99.83745 | −1.525 | 0.006919 | −0.00089 | 0.000169 |
| S15 | −8.562441 | −333 | 0.001034 | 0.000303 | 0.334 |
| S16 | 4.721166 | −0.00627 | 0.0758 | 0.001076 | 241 |
| S17 | 211.6583 | 0.005288 | 523 | 5.32E−07 | 0.000146 |
| S18 | 3.13713 | 0.006475 | −0.00855 | −0.00244 | 9.40E−05 |
| S19 | −11.47341 | −0.0109 | −0.49 | −0.00178 | −0.00055 |
| S110 | 7.885203 | −0.03454 | −0.00089 | −0.00144 | 0.174 |
| S111 | −100.0015 | −0.03985 | 0.003169 | 0.000833 | −0.00044 |

| Surface Number | E | F | G |
|---|---|---|---|
| S11 | −3.12E−06 | −4.46E−06 | −2.78E−07 |
| S12 | −1.18E−05 | 0 | 0 |
| S14 | −8.55E−06 | −9.34E−06 | 0 |
| S15 | 0.122 | 6.72E−07 | −2.71E−05 |
| S16 | 0.00114 | 4.20E−05 | −1.46E−08 |
| S17 | −1.26E−05 | −2.68E−05 | 4.81E−05 |
| S18 | 4.77E−05 | −8.48E−05 | 5.89 |
| S19 | 5.16 | 0.0126 | −1.58E−05 |
| S110 | 0.153 | −6.95E−05 | 1.31E−05 |
| S111 | −7.86E−06 | 3.57E−05 | −5.46E−06 |

For the telephoto lens assembly 1 of the first embodiment, the f1 is 9.989 mm, the TTL1 is 9.000 mm, the f1$_2$ is −8.998 mm, the f1$_3$ is 13.096 mm, the f1$_5$ is −6.043 mm, the BFL1 is 3.682 mm, the DFOV1 is 28.85 degrees. According to the above data, the following values can be obtained: |f1/TTL1|=1.110, |f1$_2$/f1|=0.901, |f1$_3$/f1|=1.311, |f1$_5$/f1|=0.605, |BFL1/TTL1|=0.409, DFOV1=28.85 degrees, which satisfy the above condition (1)-(7).

Figure 2A:
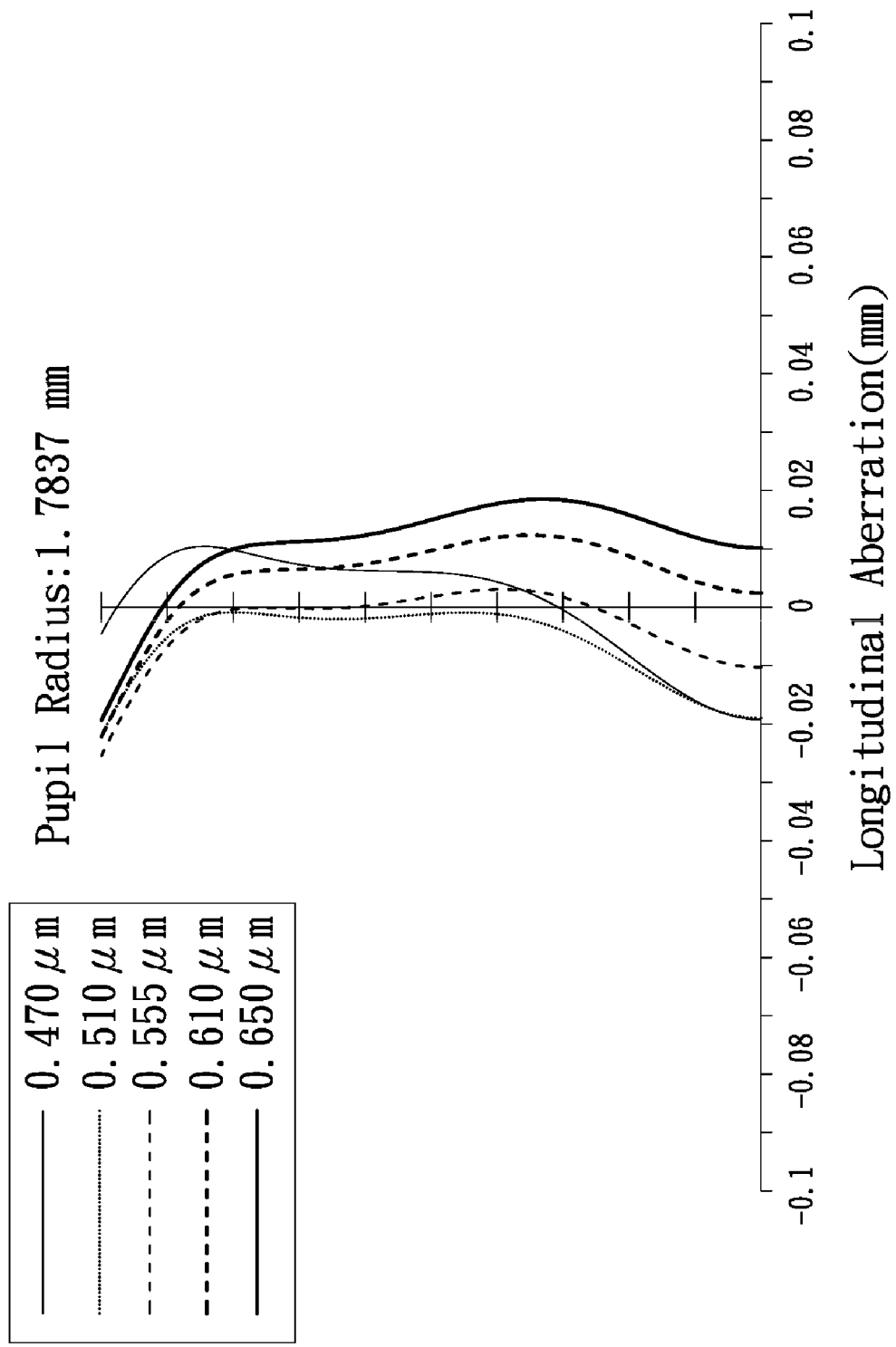
FIG. 2A is a longitudinal spherical aberration diagram of the telephoto lens assembly in accordance with the FIG. 1.
Figure 2B:
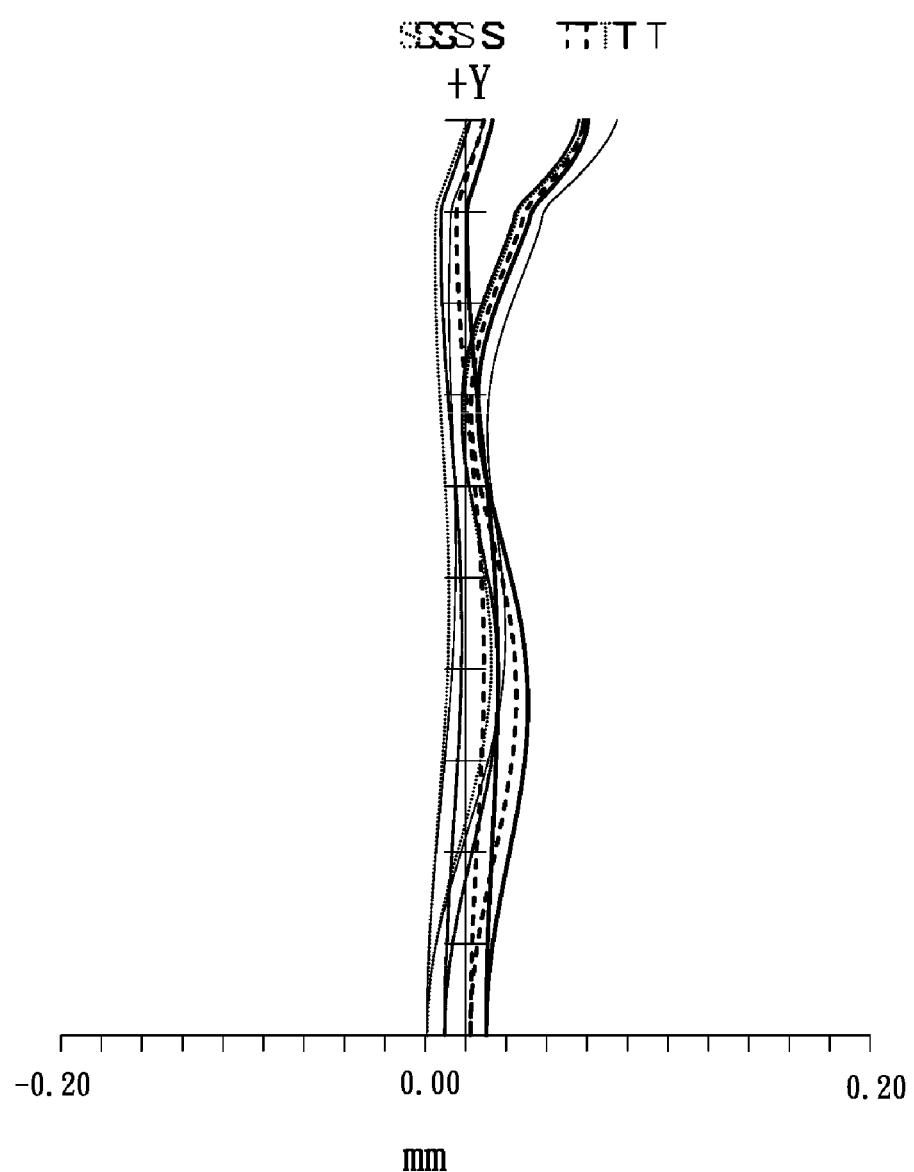
FIG. 2B is an astigmatic field curves diagram of the telephoto lens assembly in accordance with the FIG. 1.
Figure 2C:
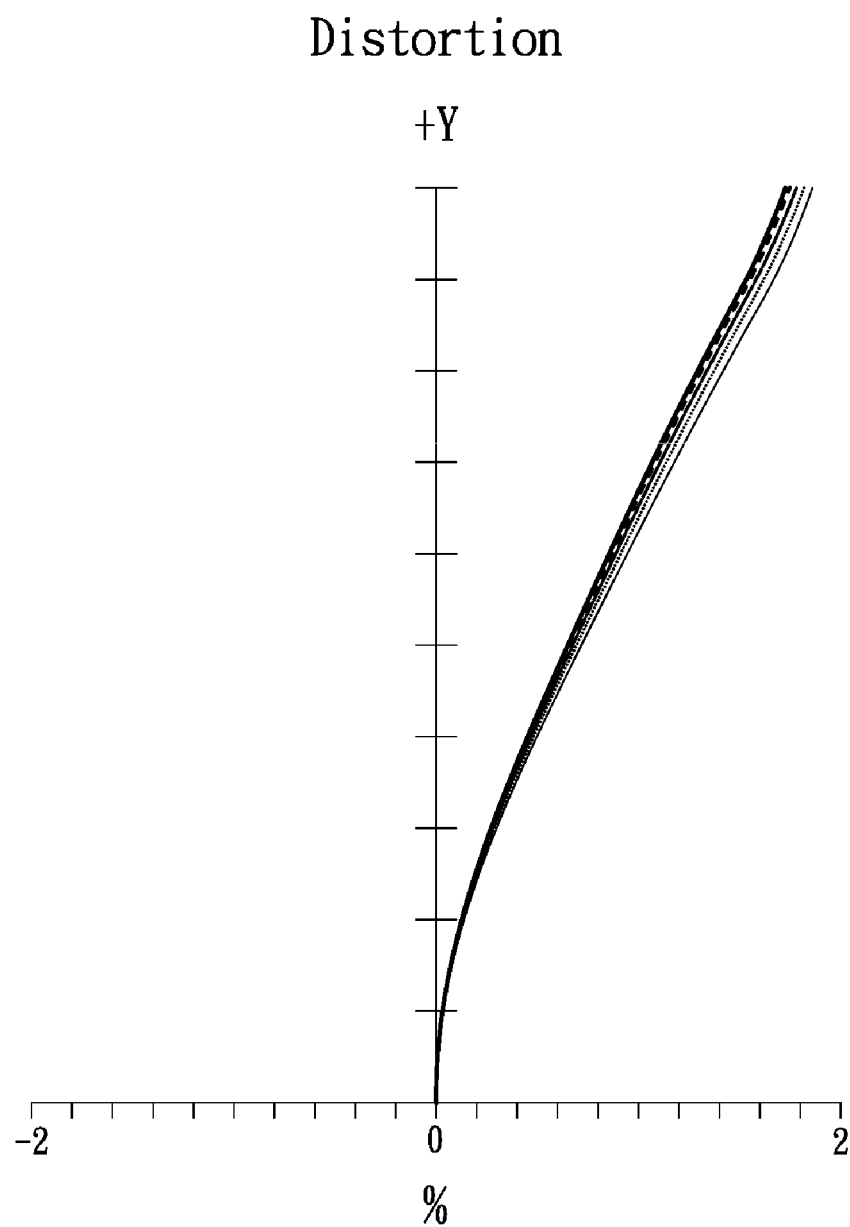
FIG. 2C is a distortion diagram of the telephoto lens assembly in accordance with the FIG. 1.
Figure 2D:
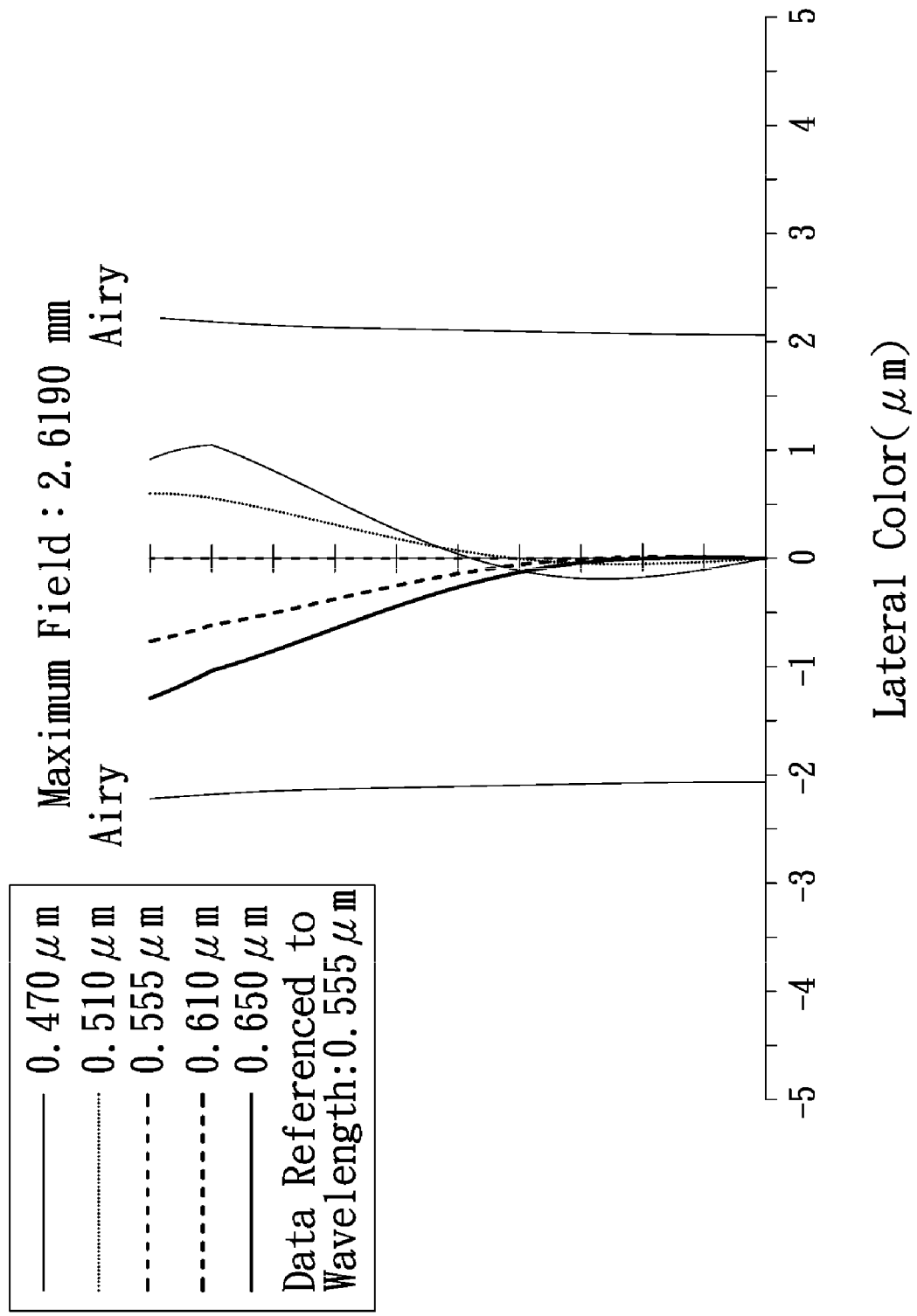
FIG. 2D is a lateral color diagram of the telephoto lens assembly in accordance with the FIG. 1.
Figure 2E:
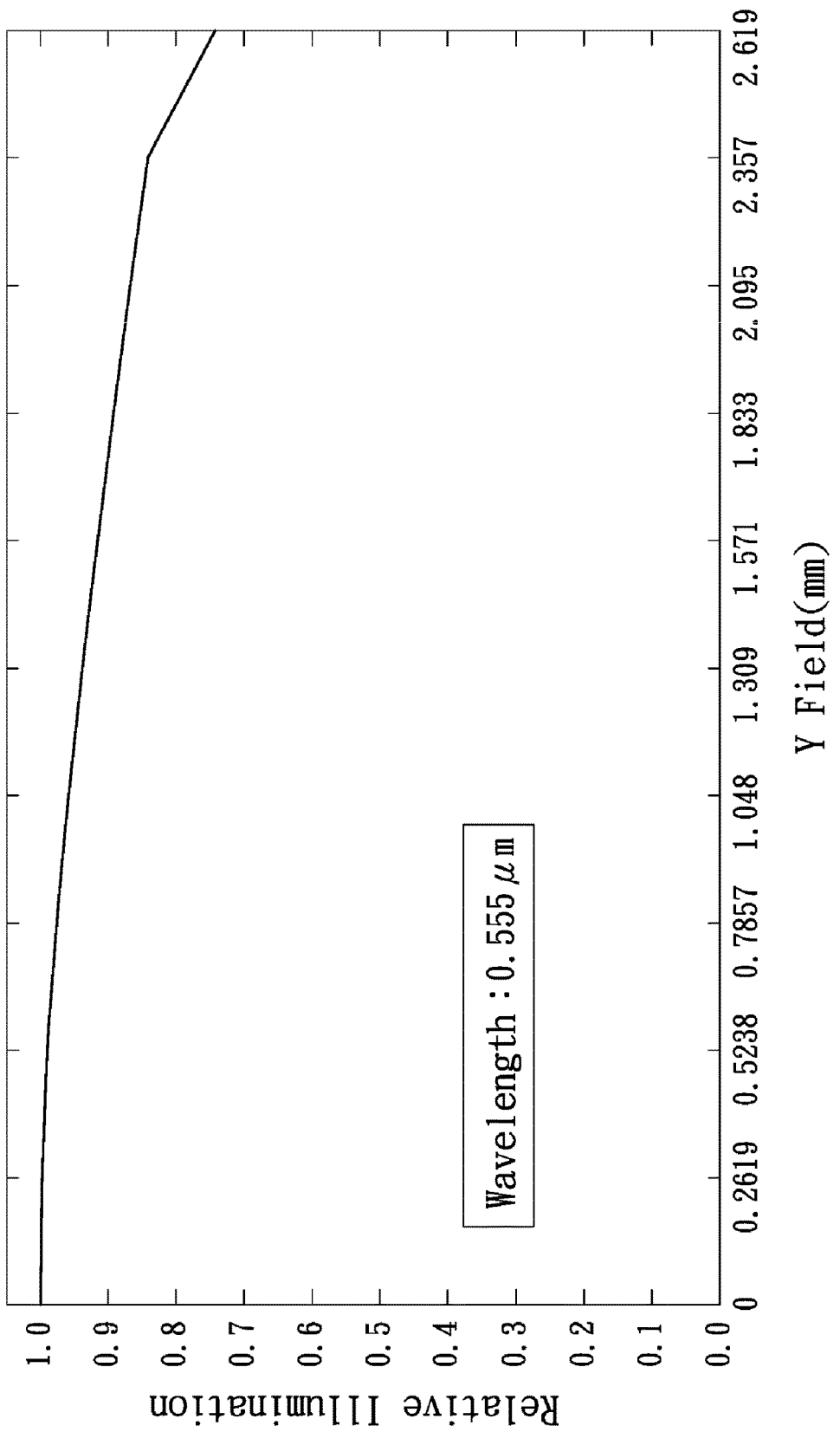
FIG. 2E is a relative illumination diagram of the telephoto lens assembly in accordance with the FIG. 1.
Figure 2F:
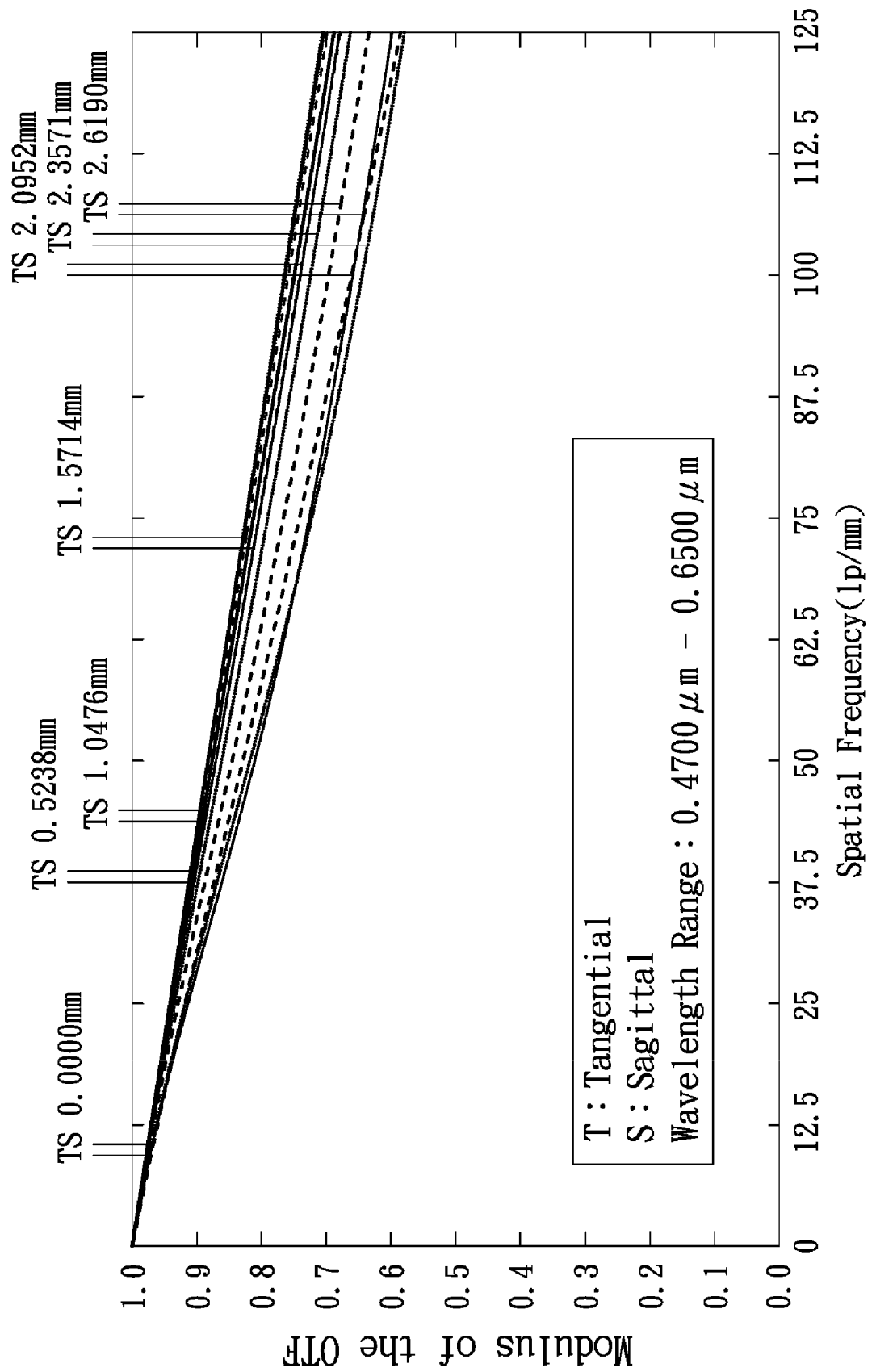
FIG. 2F is a modulation transfer function diagram of the telephoto lens assembly in accordance with the FIG. 1.
Figure 2G:
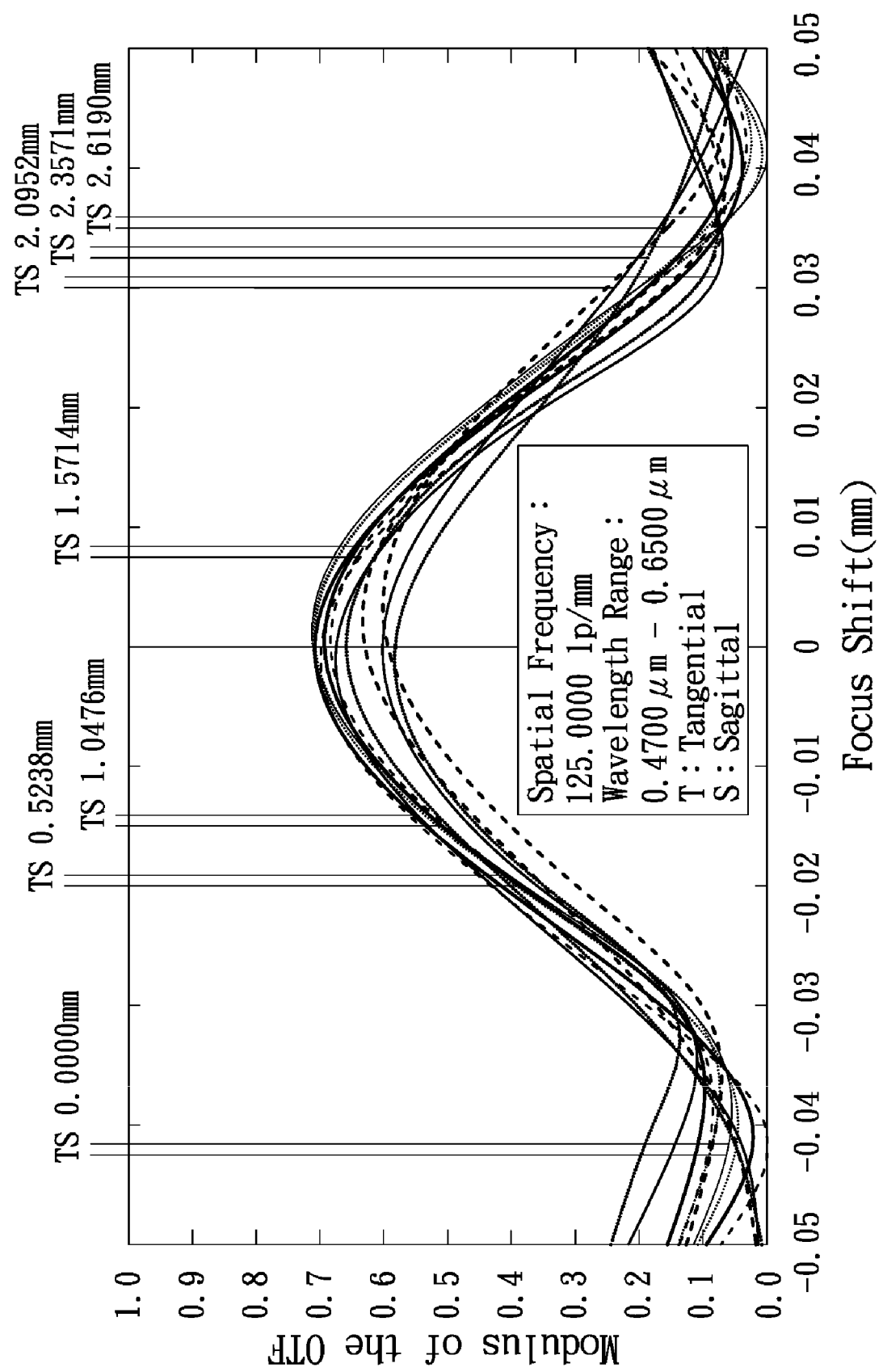
FIG. 2G is a through focus modulation transfer function diagram of the telephoto lens assembly in accordance with the FIG. 1.

By the above arrangements of the lenses and stop ST1, the telephoto lens assembly 1 of the first embodiment can meet the requirements of optical performance as seen in FIGS. 2A-2G, wherein FIG. 2A shows a longitudinal aberration diagram of the telephoto lens assembly 1 in accordance with the first embodiment of the invention, FIG. 2B shows an astigmatic field curves diagram of the telephoto lens assembly 1 in accordance with the first embodiment of the invention, FIG. 2C shows a distortion diagram of the telephoto lens assembly 1 in accordance with the first embodiment of the invention, FIG. 2D shows a lateral color diagram of the telephoto lens assembly 1 in accordance with the first embodiment of the invention, FIG. 2E shows a relative illumination diagram of the telephoto lens assembly 1 in accordance with the first embodiment of the invention, FIG. 2F shows a modulation transfer function diagram of the telephoto lens assembly 1 in accordance with the first embodiment of the invention and FIG. 2G shows a through focus modulation transfer function diagram of the telephoto lens assembly 1 in accordance with the first embodiment of the invention.

It can be seen from FIG. 2A that the longitudinal aberration in the telephoto lens assembly 1 of the first embodiment ranges from −0.03 mm to 0.02 mm for the wavelength of 0.470 µm, 0.510 µm, 0.555 µm, 0.610 µm and 0.650 µm.

It can be seen from FIG. 2B that the astigmatic field curves of tangential direction and sagittal direction in the telephoto lens assembly 1 of the first embodiment ranges between −0.02 mm and 0.08 mm for the wavelength of 0.470 µm, 0.510 µm, 0.555 µm, 0.610 µm and 0.650 µm.

It can be seen from FIG. 2C that the distortion in the telephoto lens assembly 1 of the first embodiment ranges between 0% and 2.0% for the wavelength of 0.470 µm, 0.510 µm, 0.555 µm, 0.610 µm and 0.650 µm.

It can be seen from FIG. 2D that the lateral color in the telephoto lens assembly 1 of the first embodiment ranges from −1.2 µm to 1.1 µm for the wavelength of 0.470 µm, 0.510 µm, 0.555 µm, 0.610 µm and 0.650 µm, the maximum field is 2.6190 mm.

It can be seen from FIG. 2E that the relative illumination in the telephoto lens assembly 1 of the present embodiment ranges from 0.74 to 1.0 when the wavelength is 0.555000 µm and Y field ranges from 0 mm to 2.619 mm.

It can be seen from FIG. 2F that the modulation transfer function of tangential direction and sagittal direction in the telephoto lens assembly 1 of the first embodiment ranges from 0.57 to 1.0 wherein the wavelength ranges from 0.4700 µm to 0.6500 µm, the fields respectively are 0.0000 mm, 0.5238 mm, 1.0476 mm, 1.5714 mm, 2.0952 mm, 2.3571 mm and 2.6190 mm, and the spatial frequency ranges from 0 lp/mm to 125 lp/mm.

It can be seen from FIG. 2G that the through focus modulation transfer function of tangential direction and sagittal direction in the telephoto lens assembly 1 of the first embodiment is greater than 0.2 as focus shift ranges between −0.024 mm and 0.025 mm wherein the wavelength ranges from 0.4700 µm to 0.6500 µm, each field is 0.0000 mm, 0.5238 mm, 1.0476 mm, 1.5714 mm, 2.0952 mm, 2.3571 mm and 2.6190 mm, spatial frequency is equal to 125 lp/mm.

It is obvious that the longitudinal aberration, the astigmatic field curves, the distortion, and the lateral color of the telephoto lens assembly 1 of the first embodiment can be corrected effectively, and the relative illumination, the resolution, and the depth of focus of the telephoto lens assembly 1 of the present embodiment can meet the requirement. Therefore, the telephoto lens assembly 1 of the first embodiment is capable of good optical performance.

The lens layout and optical path diagram of the second embodiment is omitted because that is similar to the lens layout and optical path diagram of the first embodiment.

The telephoto lens assembly 2 includes a first lens L21, a stop ST2, a second lens L22, a third lens L23, a fourth lens L24, a fifth lens L25 and an optical filter OF2, all of which are arranged in sequence from an object side to an image side along an optical axis OA2. In operation, an image of light rays from the object side is formed on an image plane IMA2.

The first lens L21 is a meniscus lens with positive refractive power. The first lens L21 is made of plastic material, wherein the object side surface S21 is a convex surface, the image side surface S22 is a concave surface and both of the object side surface S21 and image side surface S22 are aspheric surfaces.

The second lens L22 is a meniscus lens with negative refractive power. The second lens L22 is made of plastic material, wherein the object side surface S24 is a convex surface, the image side surface S25 is a concave surface and both of the object side surface S24 and image side surface S25 are aspheric surfaces.

The third lens L23 is a meniscus lens with positive refractive power. The third lens L23 is made of plastic material, wherein the object side surface S26 is a convex surface, the image side surface S27 is a concave surface and both of the object side surface S26 and image side surface S27 are aspheric surfaces.

The fourth lens L24 is a meniscus lens with positive refractive power. The fourth lens L24 is made of plastic material, wherein the object side surface S28 is a concave surface, the image side surface S29 is a convex surface and both of the object side surface S28 and image side surface S29 are aspheric surfaces.

The fifth lens L25 is a biconcave lens with negative refractive power. The fifth lens L25 is made of plastic material, wherein the object side surface S210 is a concave surface, the image side surface S211 is a concave surface and both of the object side surface S210 and image side surface S211 are aspheric surfaces.

Both of the object side surface S212 and image side surface S213 of the optical filter OF2 are plane surfaces.

In addition, the telephoto lens assembly 2 of the second embodiment at least satisfies one of the following conditions:

$$0.9<|f2/TTL2|<1.3 \quad (8)$$

$$0.21<|f2_2/f2|<1.53 \quad (9)$$

$$0.65<|f2_3/f2|<2.01 \quad (10)$$

$$0.10<|f2_5/2|<1.25 \quad (11)$$

$$0.4<|BFL2/TTL2|<1 \quad (12)$$

$$15 \text{ Degrees} \leq DFOV2 \leq 40 \text{ Degrees} \quad (13)$$

$$0.32<|BFL2/TTL2|<1 \quad (14)$$

wherein f2 is an effective focal length of the telephoto lens assembly 2, TTL2 is total track length which is from the object side surface S21 of the first lens L21 to the image side IMA2 along the optical axis OA2, $f2_2$ is an effective focal length of the second lens L22, $f2_3$ is an effective focal length of the third lens L23, $f2_5$ is an effective focal length of the fifth lens L25, BFL2 is back focal length which is from the image side surface S211 of the fifth lens L25 to the image side IMA2 along the optical axis OA2, DFOV2 is a diagonal field of view of the telephoto lens assembly 2.

By the above design of the lenses and stop ST2, the telephoto lens assembly 2 is provided with characteristics of a short total track length, a long back foal length, a high resolution and an aberration that can be corrected effectively.

The telephoto lens assembly 2 is provided with the optical specifications shown in Table 3. Table 3 shows that the effective focal length is equal to 9.994 mm, F-number is equal to 2.8 and total lens length is equal to 8.991 mm and diagonal field of view is equal to 28.84 degrees for the telephoto lens assembly 2 of the second embodiment of the invention.

TABLE 3

Effective Focal Length = 9.994 mm
F-number = 2.8
Total Lens Length = 8.991 mm
Diagonal Field of View = 28.84 degrees

| Surface Number | Radius of Curvature (mm) | Thickness (mm) | Nd | Vd | Remark |
|---|---|---|---|---|---|
| S21 | 2.622396 | 0.902959 | 1.544 | 55.95 | The First Lens L21 |
| S22 | 10.70694 | 0.1159803 | | | |
| S23 | ∞ | −0.02 | | | Stop ST2 |
| S24 | 10.47758 | 0.2496276 | 1.640 | 23.53 | The Second Lens L22 |
| S25 | 3.694122 | 0.1490377 | | | |
| S26 | 5.389361 | 0.4134189 | 1.515 | 56.62 | The Third Lens L23 |
| S27 | 25.60905 | 2.066365 | | | |
| S28 | −5.335345 | 0.5142568 | 1.640 | 23.53 | The fourth L24 |
| S29 | −3.463204 | 0.5345824 | | | |
| S210 | −5.105059 | 0.4000621 | 1.544 | 55.95 | The fifth lens L25 |
| S211 | 9.238449 | 0.08236867 | | | |
| S212 | ∞ | 0.21 | 1.517 | 64.17 | Optical Filter OF2 |
| S213 | ∞ | 3.3724 | | | |

The aspheric surface sag z of each lens in table 3 can be calculated by the following formula:

$$z=ch^2/\{1+[1-(k+1)c^2h^2]^{1/2}\}+Ah^4+Bh^6+Ch^8+Dh^{10}+Eh_{12}+Fh_{14}+Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

TABLE 4

| Surface Number | k | A | B | C | D |
|---|---|---|---|---|---|
| S21 | −1.035368 | 0.002225 | 0.000715 | −0.00046 | −3.19E−05 |
| S22 | −61.91851 | −0.01125 | 4418 | −0.00164 | 9.72E−05 |
| S24 | −100.0034 | −1578 | 0.06762 | −0.00095 | 0.00015 |
| S25 | −7.89735 | −0.00266 | 0.001282 | 0.000403 | 0.000372 |
| S26 | 4.996604 | −0.0585 | 0.000829 | 0.1126 | 0.00025 |
| S27 | 129.7266 | 0.004731 | 0.339 | 1.61 | 0.000115 |
| S28 | 3.699333 | 0.5828 | −0.00872 | −0.00245 | 3.79E−05 |
| S29 | −11.34992 | −0.01083 | −0.00521 | −0.00195 | −0.00056 |
| S210 | 7.879588 | −3.566 | −0.00165 | −0.00142 | 0.141 |
| S211 | −100.0023 | −0.4054 | 0.003097 | 0.000767 | −0.00043 |

| Surface Number | E | F | G |
|---|---|---|---|
| S21 | −3.10E−06 | −5.14E−06 | −7.97E−04 |
| S22 | −1.63 | 0 | 0 |
| S24 | −1.28E−05 | −8.17E−06 | 0 |
| S25 | 0.0132 | −1.26E−07 | −2.94 |
| S26 | 0.115 | 4.19E−05 | −1.55E−05 |
| S27 | −3.05 | −3.36E−05 | 4.82E−03 |
| S28 | −8.64E−06 | −0.012 | 3.80E−05 |
| S29 | 5.97E−05 | 0.00122 | −2.64E−05 |
| S210 | 9.87 | −8.30E−05 | 3.45E−05 |
| S211 | 8.01E−06 | 3.96E−05 | −7.32E−06 |

For the telephoto lens assembly 2 of the second embodiment, the f2 is 9.994 mm, the TTL2 is 8.991 mm, the $f2_2$ is −8.982 mm, the $f2_3$ is 13.112 mm, the $f2_5$ is −5.962 mm, the BFL2 is 3.665 mm, the DFOV2 is 28.84 degrees. According to the above data, the following values can be obtained: |f2/TTL2|=1.112, |$f2_2$/f2|=0.899, |$f2_3$/f2|=1.312, |$f2_5$/f2|=0.597, |BFL2/TTL2|=0.408, DFOV2=28.84 degrees, which satisfy the above condition (8)-(14).

Figure 3A:
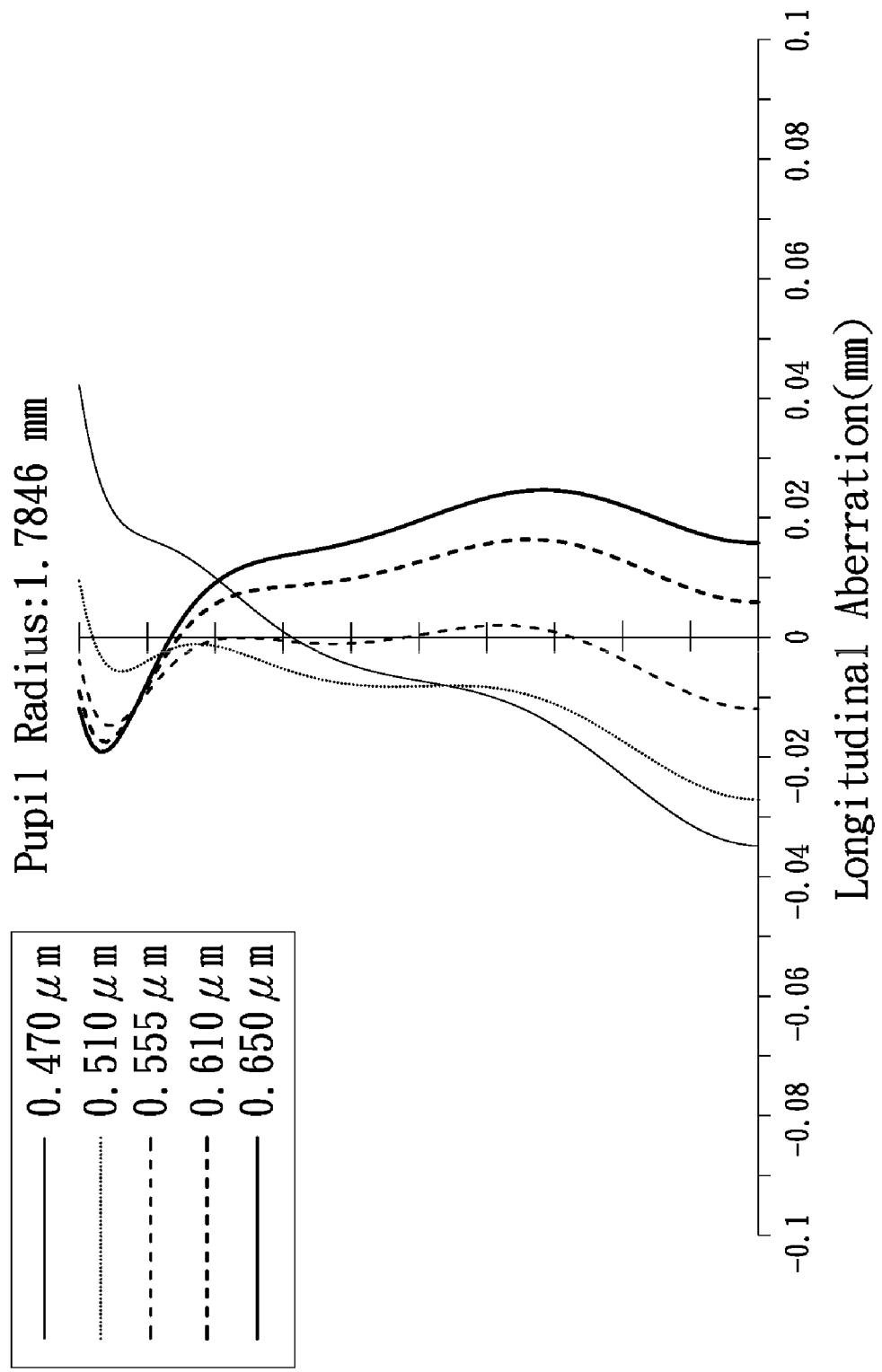
FIG. 3A is a longitudinal spherical aberration diagram of the telephoto lens assembly in accordance with the second embodiment of the invention.
Figure 3B:
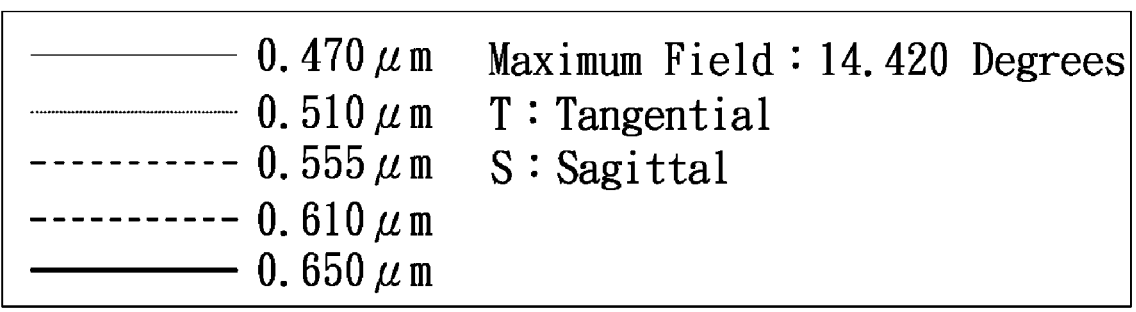
FIG. 3B is an astigmatic field curves of the telephoto lens assembly in accordance with the second embodiment of the invention.
Figure 3B:
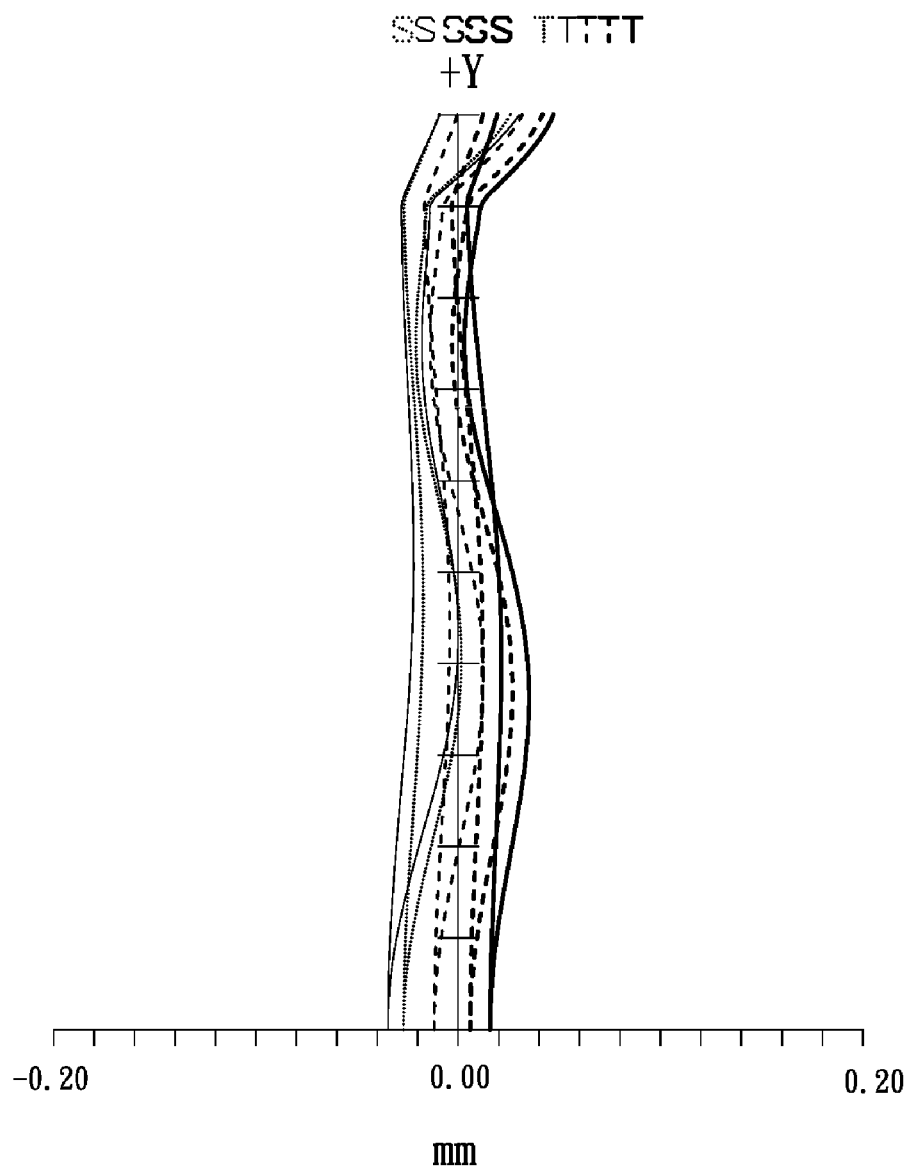
Figure 3C:
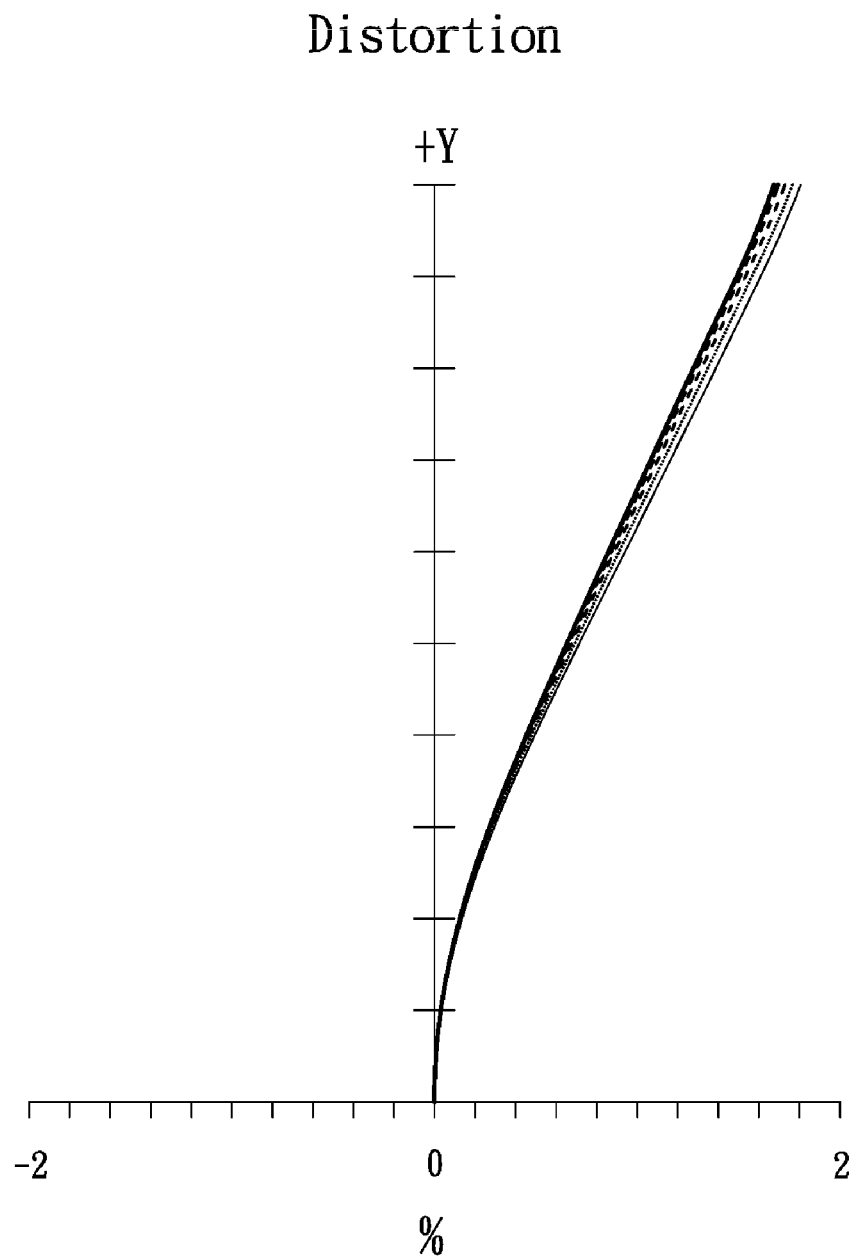
FIG. 3C is a distortion diagram of the telephoto lens assembly in accordance with the second embodiment of the invention.
Figure 3D:
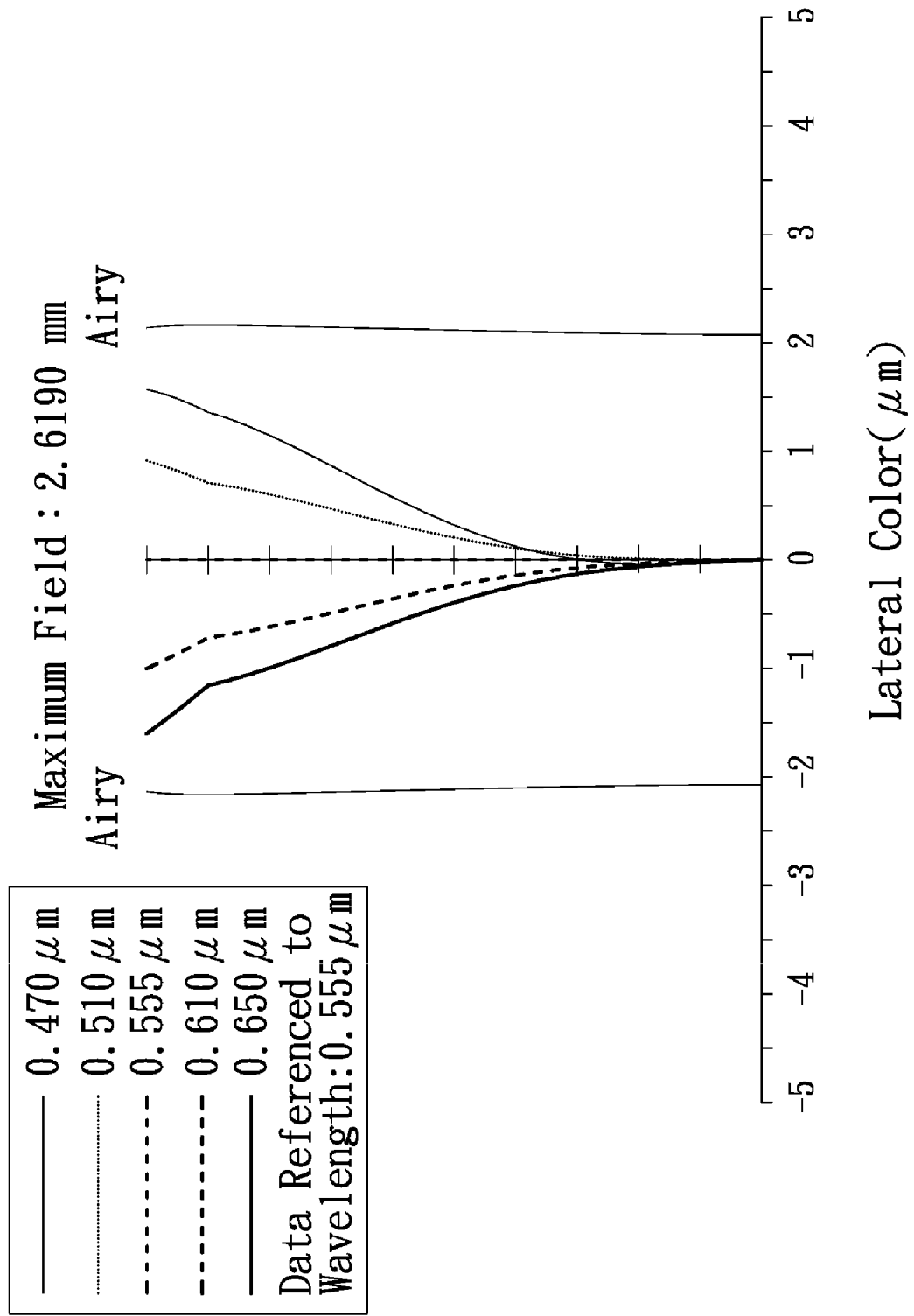
FIG. 3D is a lateral color diagram of the telephoto lens assembly in accordance with the second embodiment of the invention.
Figure 3E:
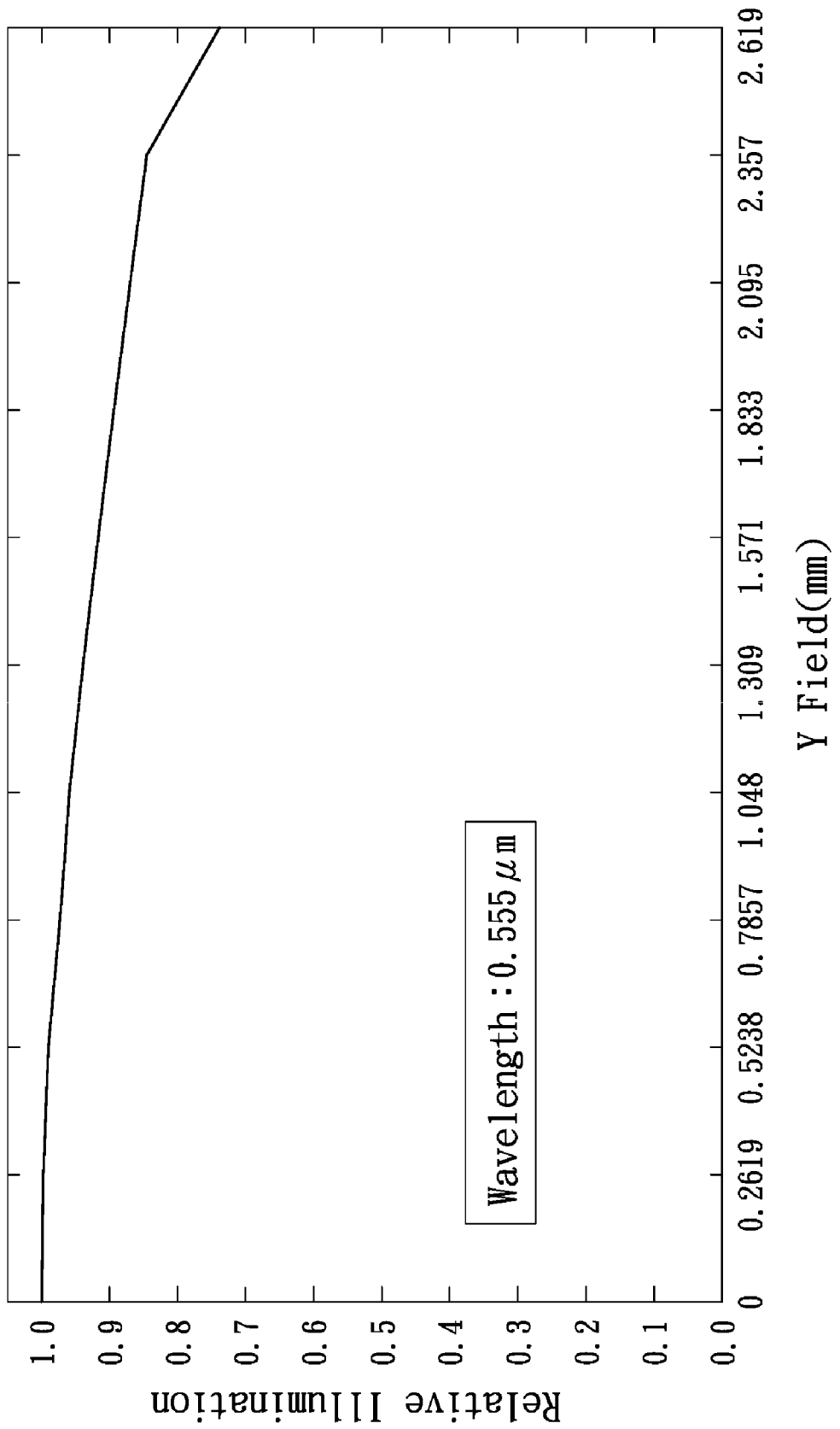
FIG. 3E is a relative illumination diagram of the telephoto lens assembly in accordance with the second embodiment of the invention.
Figure 3F:
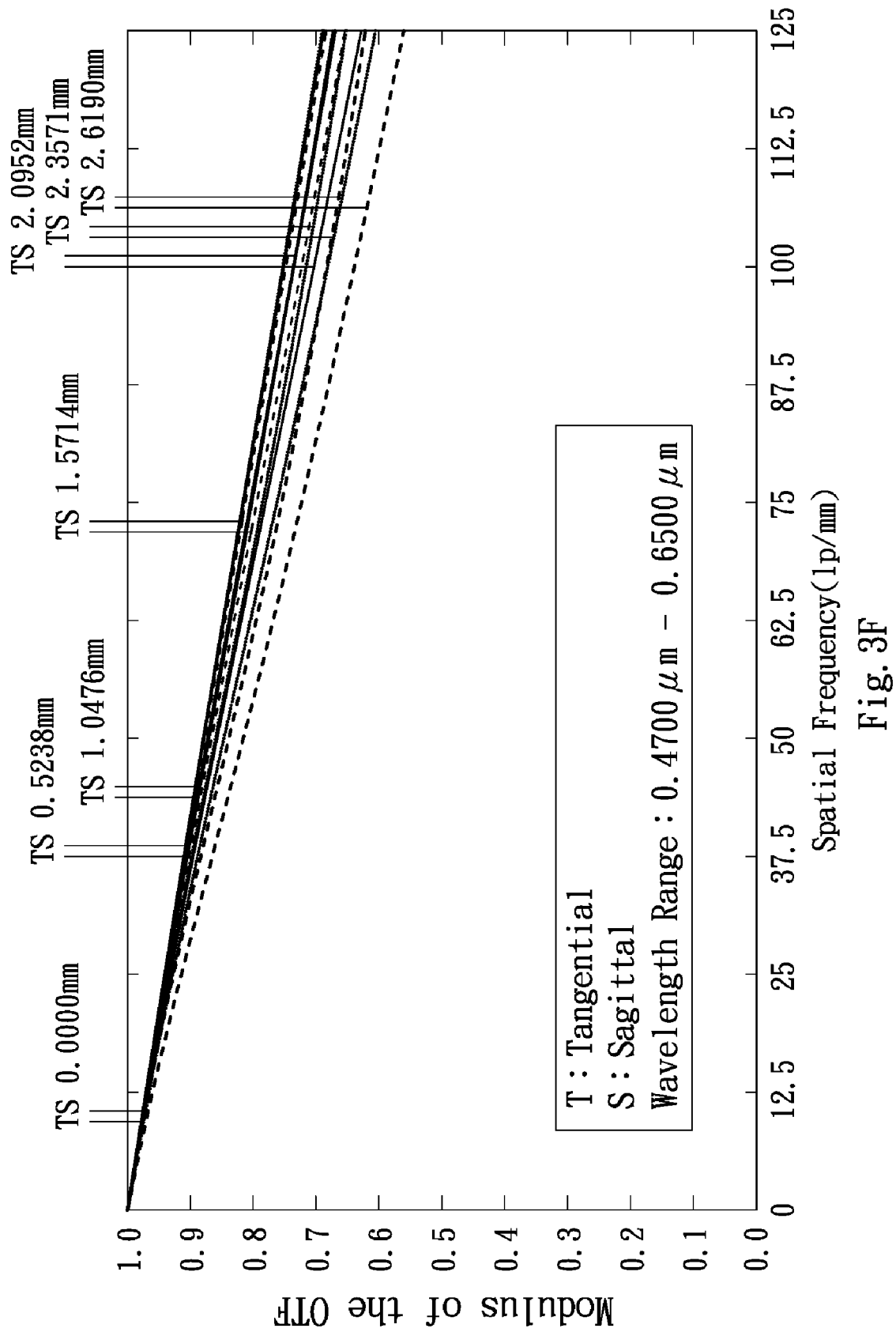
FIG. 3F is a modulation transfer function diagram of the telephoto lens assembly in accordance with the second embodiment of the invention.
Figure 3G:
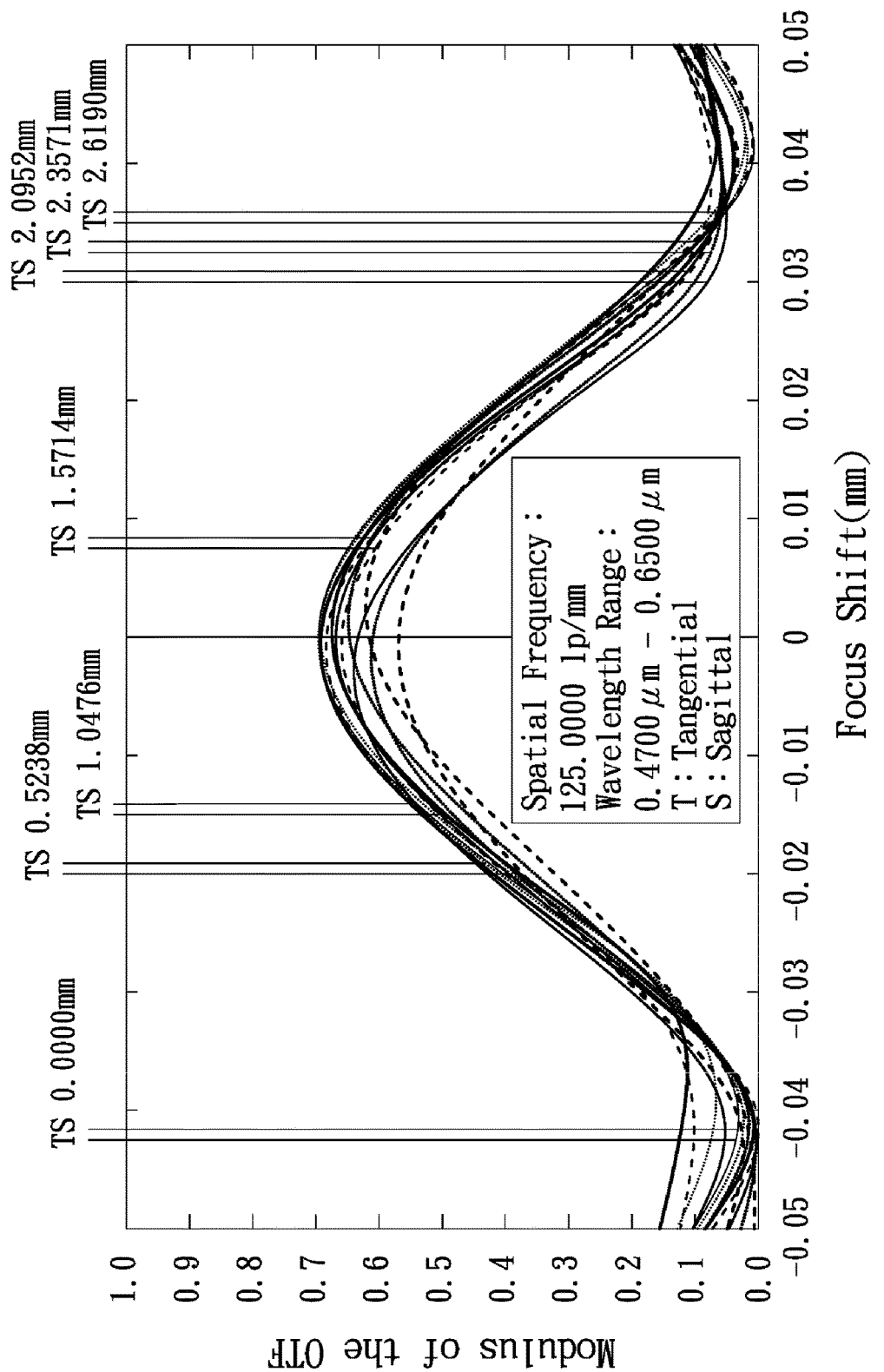
FIG. 3G is a through focus modulation transfer function diagram of the telephoto lens assembly in accordance with the second embodiment of the invention.

By the above arrangements of the lenses and stop ST2, the telephoto lens assembly 2 of the second embodiment can meet the requirements of optical performance as seen in FIGS. 3A-3G, wherein FIG. 3A shows a longitudinal aberration diagram of the telephoto lens assembly 2 in accordance with the second embodiment of the invention, FIG. 3B shows an astigmatic field curves diagram of the telephoto lens assembly 2 in accordance with the second embodiment of the invention, FIG. 3C shows a distortion diagram of the telephoto lens assembly 2 in accordance with the second embodiment of the invention, FIG. 3D shows a lateral color diagram of the telephoto lens assembly 2 in accordance with the second embodiment of the invention, FIG. 3E shows a relative illumination diagram of the telephoto lens assembly 2 in accordance with the second embodiment of the invention, FIG. 3F shows a modulation transfer function diagram of the telephoto lens assembly 2 in accordance with the second embodiment of the invention and FIG. 3G shows a through focus modulation transfer function diagram of the telephoto lens assembly 2 in accordance with the second embodiment of the invention.

It can be seen from FIG. 3A that the longitudinal aberration in the telephoto lens assembly 2 of the second embodiment ranges from −0.035 mm to 0.045 mm for the wavelength of 0.470 μm, 0.510 μm, 0.555 μm, 0.610 μm and 0.650 μm.

It can be seen from FIG. 3B that the astigmatic field curves of tangential direction and sagittal direction in the telephoto lens assembly 2 of the second embodiment ranges between −0.04 min and 0.05 mm for the wavelength of 0.470 μm, 0.510 μm, 0.555 μm, 0.610 μm and 0.650 μm.

It can be seen from FIG. 3C that the distortion in the telephoto lens assembly 2 of the second embodiment ranges between 0% and 1.8% for the wavelength of 0.470 μm, 0.510 μm, 0.555 μm, 0.610 μm and 0.650 μm.

It can be seen from FIG. 3D that the lateral color in the telephoto lens assembly 2 of the second embodiment ranges from −1.5 μm to 1.6 μm for the wavelength of 0.470 μm, 0.510 μm, 0.555 μm, 0.610 μm and 0.650 μm, the maximum field is 2.6190 mm.

It can be seen from FIG. 3E that the relative illumination in the telephoto lens assembly 2 of the present embodiment ranges from 0.73 to 1.0 when the wavelength is 0.555000 μm and Y field ranges from 0 mm to 2.619 mm.

It can be seen from FIG. 3F that the modulation transfer function of tangential direction and sagittal direction in the telephoto lens assembly 2 of the second embodiment ranges from 0.56 to 1.0 wherein the wavelength ranges from 0.4700 μm to 0.6500 μm, the fields respectively are 0.0000 mm, 0.5238 mm, 1.0476 mm, 1.5714 mm, 2.0952 mm, 2.3571 mm and 2.6190 mm, and the spatial frequency ranges from 0 lp/mm to 125 lp/mm.

It can be seen from FIG. 3G that the through focus modulation transfer function of tangential direction and sagittal direction in the telephoto lens assembly 2 of the second embodiment is greater than 0.2 as focus shift ranges between −0.026 mm and 0.024 mm wherein the wavelength ranges from 0.4700 μm to 0.6500 μm, each field is 0.0000 mm, 0.5238 mm, 1.0476 mm, 1.5714 mm, 2.0952 mm, 2.3571 mm and 2.6190 mm, spatial frequency is equal to 125 lp/mm.

It is obvious that the longitudinal aberration, the astigmatic field curves, the distortion, and the lateral color of the telephoto lens assembly 2 of the second embodiment can be corrected effectively, and the relative illumination, the resolution, and the depth of focus of the telephoto lens assembly 2 of the present embodiment can meet the requirement. Therefore, the telephoto lens assembly 2 of the second embodiment is capable of good optical performance.

The embodiment of present invention mainly satisfy condition DFOV≤40 Degrees and 0.9<|f/TTL|, and also satisfy the other condition describe above. The diagonal field of view of present invention is equal to 40 degrees or less. Nowadays, a dual-camera mobile phone usually comprised of two separate camera modules. One module would consist of a wide-angle lens. The other would consist of a telephoto lens. While capturing image, the mobile phone use software to control the switch of the magnification. When the telephoto lens assembly of present invention applied to the dual-camera mobile phone, the best condition is 15 Degrees≤DFOV≤40 Degrees. The condition 0.9<|f/TTL| is represent for a short total track length, but remain the same focus and field of view. The best condition is 0.9<|f/TTL|<1.3. When the value of the condition 0.32<|BFL/TTL|<1 is higher, the back focal length of the telephoto lens assembly is longer, and the more free space from the last lens to the sensor, which enhance the packaged yield. The condition 0.21<|f$_2$/l<1.53 decide the importance and influence extent of the second lens to the whole optical performance. The condition 0.65<|f$_3$/f|<2.01 decide the importance and influence extent of the third lens to the whole optical performance. The condition 0.10<|f$_5$/f|<1.25 decide the importance and influence extent of the fifth lens to the whole optical performance.

What is claimed is:

1. A telephoto lens assembly comprising, in order from an object side to an image side along an optical axis:
    a first lens with positive refractive power, which includes a convex surface facing the object side;
    a stop;
    a second lens with negative refractive power;
    a third lens with positive refractive power;
    a fourth lens with positive refractive power; and
    a fifth lens with negative refractive power;
    wherein the telephoto lens assembly satisfies the following condition:

DFOV≤40 Degrees wherein DFOV is a diagonal field of view of the telephoto lens assembly.

2. A telephoto lens assembly comprising, in order from an object side to an image side along an optical axis:
    a first lens with positive refractive power, which includes a convex surface facing the object side;
    a stop;
    a second lens with negative refractive power;
    a third lens with positive refractive power;
    a fourth lens with positive refractive power; and
    a fifth lens with negative refractive power;
    wherein the telephoto lens assembly satisfies the following condition:

0.9<|f/TTL| wherein f is an effective focal length of the telephoto lens assembly and TTL is total track length which is from the object side surface of the first lens to the image side along the optical axis.

3. The telephoto lens assembly as claimed in claim 1, wherein the second lens includes a convex surface facing the object side and a concave surface facing the image side, the telephoto lens assembly satisfies the following condition:

0.21<|f$_2$/f|<1.53 wherein f$_2$ is an effective focal length of the second lens and f is an effective focal length of the telephoto lens assembly.

4. The telephoto lens assembly as claimed in claim 2, wherein the second lens includes a convex surface facing the object side and a concave surface facing the image side, the telephoto lens assembly satisfies the following condition:

0.21<|f$_2$/f|<1.53 wherein f$_2$ is an effective focal length of the second lens.

5. The telephoto lens assembly as claimed in claim 1, wherein the third lens includes a convex surface facing the object side and a concave surface facing the image side, the telephoto lens assembly satisfies the following condition:

0.65<|f$_3$/f|<2.01 wherein f$_3$ is an effective focal length of the third lens and f is an effective focal length of the telephoto lens assembly.

6. The telephoto lens assembly as claimed in claim 2, wherein the third lens includes a convex surface facing the object side and a concave surface facing the image side, the telephoto lens assembly satisfies the following condition:

0.65<|f$_3$/f|<2.01 wherein f$_3$ is an effective focal length of the third lens.

7. The telephoto lens assembly as claimed in claim 1, wherein the telephoto lens assembly satisfies the following condition:

0.10<|f$_5$/f|<1.25 wherein f$_5$ is an effective focal length of the fifth lens and f is an effective focal length of the telephoto lens assembly.

8. The telephoto lens assembly as claimed in claim 2, wherein the telephoto lens assembly satisfies the following condition:

0.10<|f$_5$/f|<1.25 wherein f$_5$ is an effective focal length of the fifth lens and f is an effective focal length of the telephoto lens assembly.

9. The telephoto lens assembly as claimed in claim 1, wherein the telephoto lens assembly satisfies the following condition:

0.32<|BFL/TTL|<1 wherein BFL is back focal length which is from the image side of the fifth lens to the image side along the optical axis and TTL is total track length which is from the object side surface of the first lens to the image side along the optical axis.

10. The telephoto lens assembly as claimed in claim 2, wherein the telephoto lens assembly satisfies the following condition:

0.32<|BFL/TTL|<1 wherein BFL is back focal length which is from the image side of the fifth lens to the image side along the optical axis and TTL is total track length which is from the object side surface of the first lens to the image side along the optical axis.

11. The telephoto lens assembly as claimed in claim 9, wherein the telephoto lens assembly satisfies the following condition:

0.4<|BFL/TTL|<1 wherein BFL is back focal length which is from the image side of the fifth lens to the image side along the optical axis and TTL is total track length which is from the object side surface of the first lens to the image side along the optical axis.

12. The telephoto lens assembly as claimed in claim 10, wherein the telephoto lens assembly satisfies the following condition:
wherein BFL is back focal length which is from the image side of the fifth lens to the image side along the optical axis and TTL is total track length which is from the object side surface of the first lens to the image side along the optical axis.

13. The telephoto lens assembly as claimed in claim 1, wherein the first lens, the second lens, the third lens, the forth lens and the forth lens at least one of the surfaces is aspherical and is made of plastic material, the fourth lens includes a concave surface facing the object side and a convex surface facing the image side, the fifth lens includes a concave surface facing the image side.

14. The telephoto lens assembly as claimed in claim 2, wherein the first lens, the second lens, the third lens, the forth lens and the forth lens at least one of the surfaces is aspherical and is made of plastic material, the fourth lens includes a concave surface facing the object side and a convex surface facing the image side, the fifth lens includes a concave surface facing the image side.

15. The telephoto lens assembly as claimed in claim 1, wherein the telephoto lens assembly satisfies the following condition:

$$15 \text{ Degrees} \leq DFOV \leq 40 \text{ Degrees}$$

$$0.9 < |f/TTL| < 1.3$$

wherein f is an effective focal length of the telephoto lens assembly and TTL is total track length which is from the object side surface of the first lens to the image side along the optical axis.

16. The telephoto lens assembly as claimed in claim 2, wherein the telephoto lens assembly satisfies the following condition:

$$15 \text{ Degrees} \leq DFOV \leq 40 \text{ Degrees}$$

$$0.9 < |f/TTL| < 1.3$$

wherein DFOV is a diagonal field of view of the telephoto lens assembly.

* * * * *